United States Patent [19]

Jackson et al.

[11] 4,444,661
[45] Apr. 24, 1984

[54] FILTER DEVICE

[75] Inventors: Mark E. Jackson; Monty E. Vincent, both of Ann Arbor; Attila Vadnay, Saline, all of Mich.

[73] Assignee: Gelman Sciences Inc., Ann Arbor, Mich.

[21] Appl. No.: 369,320

[22] Filed: Apr. 16, 1982

[51] Int. Cl.³ .............................................. B01D 25/00
[52] U.S. Cl. ..................................... 210/446; 210/447
[58] Field of Search ................. 210/446, 94, 450, 451, 210/453, 447; 215/273, 274, 275; 220/315, 319, 320, 324; 264/251, 252

[56] References Cited

U.S. PATENT DOCUMENTS

| | | | |
|---|---|---|---|
| 2,108,583 | 2/1938 | Falk | 215/274 |
| 2,879,207 | 11/1954 | Poitras | 210/94 |
| 3,932,153 | 1/1976 | Byrns | 210/446 |
| 3,954,625 | 5/1976 | Michalski | 210/446 |
| 4,074,985 | 2/1978 | Willas | 210/450 |
| 4,111,807 | 9/1978 | Boomus et al. | 210/446 |
| 4,113,627 | 9/1978 | Leason | 210/446 |
| 4,115,277 | 9/1978 | Swank | 210/927 |
| 4,159,954 | 7/1979 | Gangeni | 210/446 |
| 4,190,542 | 2/1980 | Hodgson et al. | 210/446 |
| 4,250,141 | 2/1981 | Lehmann et al. | 210/446 |
| 4,340,470 | 7/1982 | Van Mol | 210/94 |

FOREIGN PATENT DOCUMENTS 2546881  10/1974  Fed. Rep. of Germany ...... 210/450

Primary Examiner—Charles N. Hart
Assistant Examiner—Wanda L. Millard
Attorney, Agent, or Firm—Reising, Ethington, Barnard, Perry & Milton

[57] ABSTRACT

A disposable filter device having a plastic housing with inlet and outlet chambers separated by a filter disc sealed within the housing, the housing being readily disassemblable after use to remove the filter disc for identification or analysis of the material filtered from the fluid.

4 Claims, 4 Drawing Figures

FILTER DEVICE

TECHNICAL FIELD

This invention relates to a disposable in-line filter of the type having a housing divided into inlet and outlet chambers by a filter membrane having its periphery sealed to the housing, the filter of this invention being readily disassemblable so that the filter membrane can be removed as for identification or analysis of the material filtered from the fluid during use of the filter.

BACKGROUND ART

Disposable in-line filters are conventionally made of two molded organic plastic housing components with peripheral flanges which are permanently sealingly bonded together with the periphery of the filter membrane therebetween. Such in-line filters can be made at relatively low cost; however, after use the filter membrane cannot be removed intact for identification and analysis of materials thereon resulting from the filtration. Disassemblable in-line filters enabling filter membrane removal after filtration are known; however, they have been of costly construction rendering it uneconomical to dispose of them after just one use. On the other hand, reuse of such filters is likewise uneconomical because of the cleaning operations required between uses.

The filter device of the present invention is readily disassemblable for filter membrane removal after use but yet of relatively low cost construction to the end that it can be disposed of after just one use without economic sacrifice.

BRIEF DESCRIPTION OF THE INVENTION

In accordance with the present invention the filter housing comprises two organic plastic moldings with cylindrical side walls which telescope together in abutting relationship, the moldings having end walls with annular surfaces adjacent their peripheries. The filter membrane is positioned with its periphery between the annular surfaces, there being a seal ring of resilient material between one of the annular surfaces and the periphery of the membrane such that when the cylindrical side walls of the moldings are telescoped together the periphery of the membrane is sealed to the housing. A deformable annulus of organic plastic surrounds the telescoped side walls of the moldings to maintain the moldings in their assembled relationship with the membrane sealed therein prior to and during filtration, but the annulus of organic plastic being easily removable by deformation thereof after filtration whereby the moldings can be disassembled and the filter membrane removed. In the preferred embodiment to be described the annulus of organic plastic is molded around and against the telescoped side walls of the moldings as a final step in the manufacture of the filter device. Also, in the preferred embodiment the annulus of organic plastic is rendered readily deformable by molding it with at least one and preferably two diametrically opposed circumferential portions of reduced cross section so that such circumferential portions can be easily stretched or fractured for removal of the annulus.

These and other features and advantages will appear more clearly from the detailed description of a preferred embodiment of the invention which follows.

BEST MODE FOR THE PRACTICE OF THE INVENTION

Figure 1:
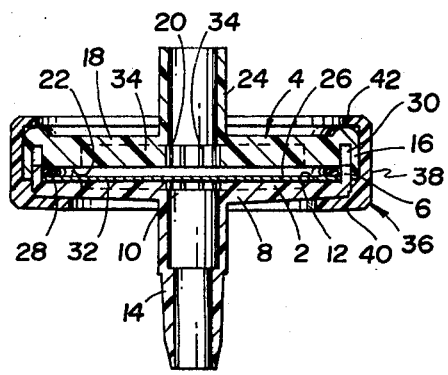
FIG. 1 is a side view in section of a preferred embodiment of the invention.
Figure 2:
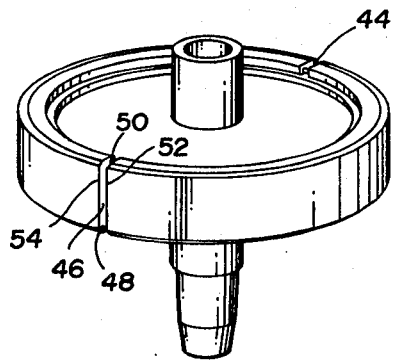
FIG. 2 is a perspective view of the device shown in FIG. 1.

The device shown has a housing comprising two moldings, 2 and 4, of organic plastic, preferably transparent. Molding 2 has a cylindrical side wall 6 and an axial end wall 8, the latter having a fluid opening 10 at its center and an annular surface 12 which is adjacent its periphery and concentric with the side wall 6. The opening 10 communicates with an integral tube 14 which serves as a fluid outlet.

The molding 4 likewise has a cylindrical side wall 16 and an axial end wall 18 with an opening 20 at its center and an annular surface 22 adjacent its periphery and concentric with side wall 16, the opening 20 communicating with an integral tube 24 which serves as a fluid inlet.

The two moldings are assembled with the side wall 6 of the molding 2 telescoped within and abutting cylindrical wall 16 of the molding 4. Filter disc 26, e.g. a porous or microporous membrane, is positioned with its periphery between the annular surface 12 and 22, a resilient seal ring 28 being positioned between the annular surface 22 and the periphery of the filter disc. The resilient seal ring, preferably round in cross section, is of a relatively soft deformable elastomer and the filter disc is compressable to non-porosity. In the assembly as shown and described, the cylindrical wall 6 is telescoped sufficiently into cylindrical wall 16 to apply pressure to the seal ring and to the periphery of the filter disc to compress the latter to non-porosity whereby the filter disc is sealed within the housing, the one side of the filter disc periphery being compressed in fluid-tight relationship against the annular surface 12 and the pressed seal ring providing a fluid-tight seal between the annular surface 22 and the other side of the filter disc periphery. An annular groove 30 between the cylindrical wall 16 and the annular surface 22 of the molding 4 is aligned with the cylindrical wall 6 and can receive the cylindrical wall when it is telescoped into the cylindrical wall 16 sufficiently to provide the seal.

Molding 2 has a plurality of equally spaced ribs 32 extending radially outwardly from the opening 10 to the annular surface 12 and serve as a support for the filter disc. It will be noted that in the embodiment shown the filter disc could, if desired, be positioned such that its periphery would be against the annular surface 22 and with the annular seal ring 28 being positioned between the annular surface 12 and the periphery of the filter disc. Hence, in the embodiment shown the molding 4 also has radially extending ribs, like the ribs 32 of molding 2, to serve as a support for the filter disc if it is desired to position the filter disc with its periphery against the annular surface 22 instead of against annular surface 12 as shown. With such assembly, rather than that shown, tube 14 would, of course, serve as the fluid inlet and tube 24 as the fluid outlet.

Figure 3:
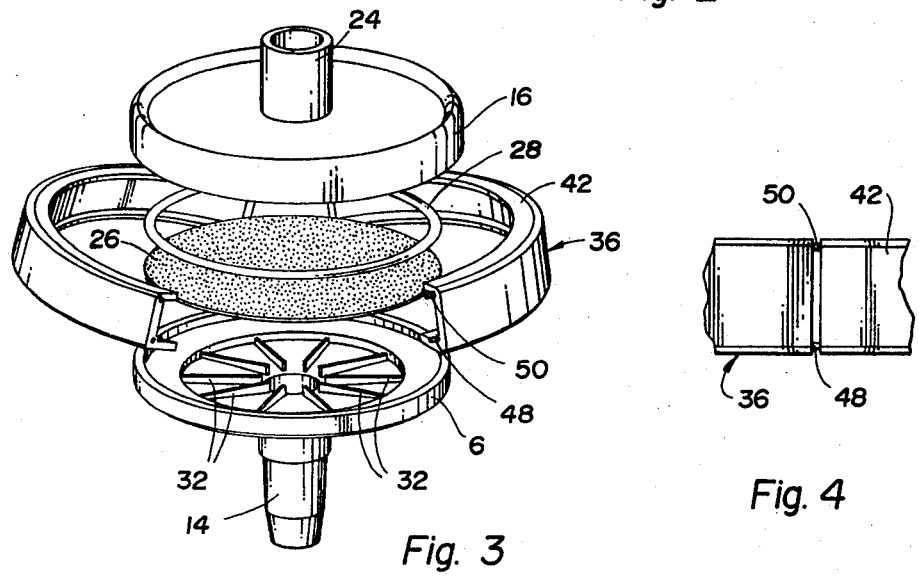
FIG. 3 is an exploded perspective view of the device shown in FIGS. 1 and 2 upon disassembly thereof.
Figure 4:
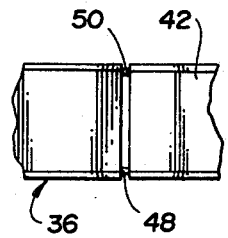
FIG. 4 is an enlarged fragmentary view of one of the components of the FIG. 1-3 embodiment.

The moldings 2 and 4 with the filter disc and seal ring therebetween are maintained in their assembled relationship, as described, by a deformable annulus 36 of organic plastic. In the preferred embodiment shown the annulus 36 has a cylindrical axial center portion 38 which abuts cylindrical walls 16 and 6 and with radially inwardly extending flanges 40 and 42, flange 40 abutting end wall 8 of the molding 2 and the flange 42 abutting the end wall 18 of molding 4. Hence, the assembled moldings 2 and 4 are mechanically locked within this generally C-shaped cross section of the annulus 36. Further, in the preferred embodiment shown, the annulus 36 has two diametrically opposed portions 44 and 46 of reduced cross section thereby to enable easy deformation of the annulus by stretching or rupturing one or both of the portions 44 and 46. In the embodiment shown each of the portions of reduced cross section consists of a pair of thin generally cylindrical stringers 48 and 50 which are about 1/16" in length. Hence, the gap between the opposed circumferential portions 52 and 54 to which the stringers are joined is about 1/16". This enables easy stretching or rupture of the stringers by inserting a knife blade or coin into the gap and wedging the circumferential portions 52 and 54 apart whereupon the annulus 36 can be easily removed and the moldings 2 and 4 disassembled for removal of the filter disc. FIG. 3 shows the filter device in disassembled form after rupture of the stringers 48 and 50 on one side of the annulus with resulting deformation and easy removal of the annulus 36. By providing the annulus with two diametrically opposed thin sections, when one thin section is ruptured the other functions as a hinge to further simplify deformation and removal of the annulus. Further, by using two stringers which are axially spaced, one adjacent one axial end of the annulus and the other adjacent the other axial end of the annulus, there is ample assurance against unauthorized and unwanted premature deformation of the annulus while yet enabling easy deformation and removal of the annulus when desired.

In the preferred embodiment the annulus 36 is molded in situ against the assembled moldings 2 and 4. That is, after the moldings are assembled with the filter disc and seal ring therebetween, such assembly is placed in a fixture (not shown) which maintains cylindrical wall 36 telescoped sufficiently into cylindrical wall 16 to provide the desired seal, and which includes an annular mold cavity, the inner wall of which consists of the peripheral portions of the assembly to be in contact with the annulus. The organic plastic of which the annulus is to be formed is then injected into the mold cavity thereby to mold the annulus in situ against the moldings. The shape of the mold cavity is, of course, such as to provide the annulus shape desired. Also, it will be understood that the organic plastic of which the annulus is formed should be such as not to bond to the organic plastic of the moldings, and the molding temperature and time should be such as not to soften and deform moldings 2 and 4 during the annulus molding operation. Polyethylene or polypropylene serves well as the organic plastic for the annulus and an acrylic or polystyrene serves well as the organic plastic for the moldings 2 and 4.

It will be understood that while the invention has been described in its particulars with reference to a preferred embodiment thereof, various changes and modifications may be made all within the full and intended scope of the claims which follow.

What is claimed is:

1. A disposable filter device comprising a housing which includes two organic plastic moldings, each of said moldings having a cylindrical side wall and an end wall with a fluid opening adjacent the center thereof and with an annular surface adjacent the periphery thereof and concentric with said cylindrical side wall, the cylindrical side walls of said two moldings being in abutting telescoped relationship; a filter disc with the periphery thereof positioned between said annular surfaces of said two moldings; a resilient seal ring between the periphery of said filter disc and one of said annular surfaces; and an annulus of organic plastic surrounding the telescoped end walls of said moldings and maintaining said moldings in assembled relationship with the side walls thereof telescoped together sufficiently to compress and seal the periphery of the filter disc and seal ring between said annular surfaces, said annulus being unbonded to said organic plastic moldings and having at least one circumferential portion of reduced cross-section thereby to render the annulus deformable such that the annulus can be deformed for removal thereof from said plastic moldings whereby said moldings can be disassembled for removal of the filter disc therefrom.

2. A filter device as set forth in claim 1 wherein said annulus of organic plastic has radially inwardly extending flanges at the axial ends thereof which bear against the end walls of said moldings.

3. A filter device as set forth in claim 1 wherein said annulus of organic plastic is molded in situ against said telescoped cylindrical walls of the moldings.

4. A filter device as set forth in claim 1, 2 or 3 wherein said annulus of organic plastic has two diametrically opposed circumferential portions of reduced cross section.

* * * * *